US005111925A

United States Patent [19]

Evreux et al.

[11] Patent Number: 5,111,925

[45] Date of Patent: May 12, 1992

[54] DEVICE FOR AUTOMATICALLY HALTING AN ELECTRIC MOTOR AFTER A CERTAIN NUMBER OF REVOLUTIONS

[75] Inventors: Gérard Evreux, Ayze; Didier Camps, Cluses, both of France

[73] Assignee: Somfy, Cluses, France

[21] Appl. No.: 626,735

[22] Filed: Dec. 13, 1990

[30] Foreign Application Priority Data

Dec. 22, 1989 [FR] France ............................ 89 17072

[51] Int. Cl.$^5$ ...................... H01H 19/18; E06B 9/68; H02P 3/02

[52] U.S. Cl. ................................ 192/141; 74/89.15; 74/424.8 R; 192/143

[58] Field of Search ............................ 192/141, 143; 74/424.8 B, 424.8 R, 89.15

[56] References Cited

U.S. PATENT DOCUMENTS

| | | | |
|---|---|---|---|
| 2,247,562 | 7/1941 | Santen | 74/424.8 R X |
| 3,468,401 | 9/1969 | Letz | 74/424.8 R X |
| 3,493,233 | 2/1970 | Foufounis | 74/89.15 |
| 3,718,215 | 2/1973 | Mimeur | 192/141 |
| 4,910,419 | 3/1990 | Hayashi et al. | 192/143 X |

*Primary Examiner*—Rodney H. Bonck
*Attorney, Agent, or Firm*—Laff, Whitesel, Conte & Saret

[57] ABSTRACT

A device in which a sliding-gear nut is displaced on a threaded rod, one of these elements being driven in rotation by the motor to be controlled, the sliding-gear nut actuating a switch when it arrives at the end of its travel after a determined number of revolutions of the motor. The sliding-gear nut is integral in rotation with a second nut intended to interact with a second threaded part situated at the end of the first threaded part, of diameter greater than the diameter of the first threaded part and the pitch of the screw thread of which is substantially greater than the pitch of the screw thread of the first threaded part, with the result that when the second nut engages with the second threaded part, it is displaced more quickly than the first nut and quickly actuates the switch. This improvement enables the accuracy of the halting of the motor to be increased, independently of the size of the pitch of the first threaded part, in other words independently of the length of this threaded part, in other words independently of the size of the device.

8 Claims, 8 Drawing Sheets

FIG 9
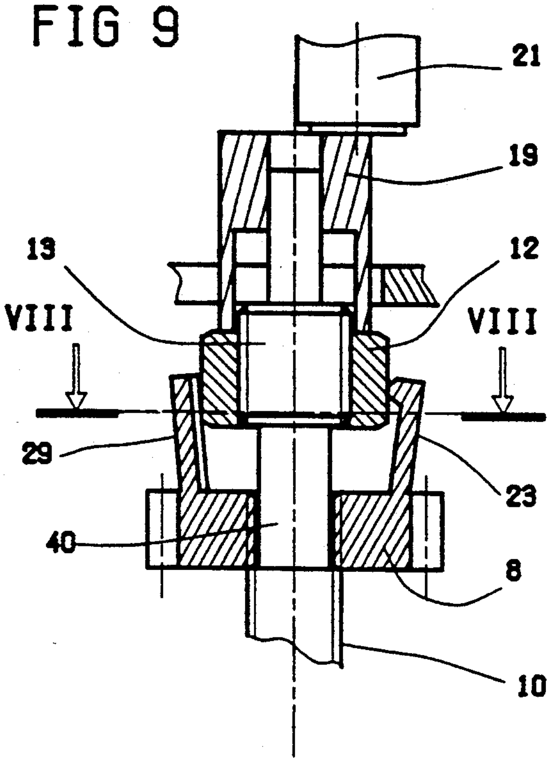
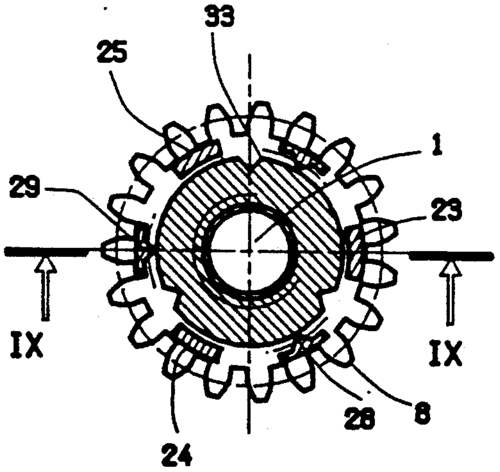
FIG 8
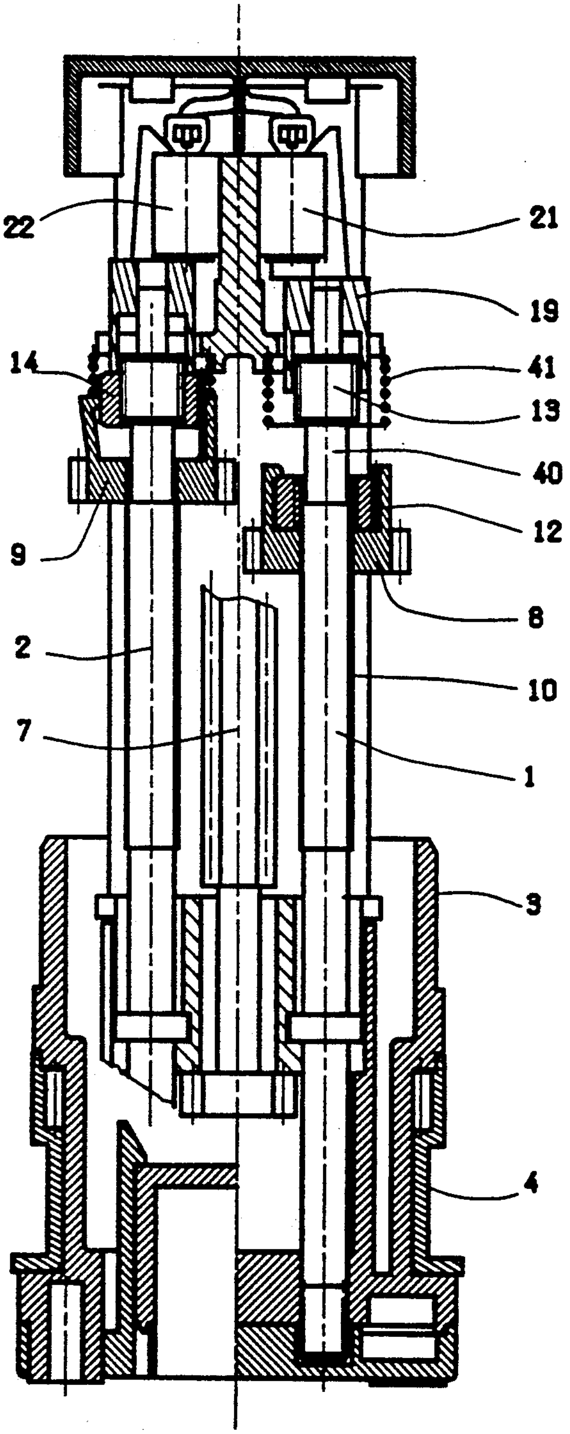
FIG 7

DEVICE FOR AUTOMATICALLY HALTING AN ELECTRIC MOTOR AFTER A CERTAIN NUMBER OF REVOLUTIONS

FIELD OF THE INVENTION

The subject of the present invention is a device for automatically halting an electric motor after a certain number of revolutions comprising at least one threaded bar on which is mounted a sliding-gear nut, means for coupling to the motor which drive one of these elements, the bar or the nut, in rotation, means for immobilizing the other of said elements in rotation, and a switch actuated when the sliding-gear nut reaches the end of its travel on the threaded part of the bar.

PRIOR ART

Such devices are used, in particular, for ensuring the halting, at a predetermined position, of roller shutters, of blinds and of motorized doors. These halting devices generally operate both for closing and opening, and comprise two threaded bars mounted in parallel and each provided with a sliding-gear nut. The threaded bars are either fixed in rotation or driven in rotation. In the first case, as described for example in French Patent 2,076,529, the sliding-gear nuts have the form of toothed pinions driven in rotation by a common splined shaft, itself driven by the motor. In the other case, the threaded bars are driven in rotation by the motor, while the sliding-gear nuts are retained in rotation by a smooth bar on which they are displaced, as described in French Patent 2,412,483.

The capacity for counting the number of revolutions of such devices is determined by the number of threads of the threaded part of the bar, and the accuracy of the halting as a function of the displacement of the sliding-gear nut for one bar revolution, in other words of the size of the pitch of the thread of the threaded part. Now the space available for housing the halting device in an installation is often restricted, and the threaded bar cannot exceed a certain length, and if it is nevertheless desired to preserve a sufficient counting capacity, there is often no other course of action than to reduce the size of the pitch to the detriment of the accuracy of the halting, which sometimes proves to be insufficient. In a general manner, if the features of counting capacity, size and accuracy are considered, any improvement in one of these features takes place to the detriment of at least one of the other features.

SUMMARY OF THE INVENTION

The object of the invention is to provide an automatic halting device which enables precisely one of the three above features to be improved without reducing the quality of the other features.

The automatic halting device according to the invention is defined in that the threaded bar has, at one of its ends, a second threaded part, substantially shorter than the first part, of diameter greater than the diameter of the first threaded part and the thread of which has a pitch substantially greater than the pitch of the thread of the first threaded part, in that the device comprises a second sliding-gear nut linked to the first nut and interacting with the second threaded part of the bar, and means for making the two nuts integral in rotation whilst at the same time permitting a limited relative axial displacement of the nuts, when the second nut engages with the second threaded part of the bar, the switch being actuated, directly or indirectly, by the second nut after a certain displacement of the latter on the second threaded part of the bar.

In the counting phase, the second nut is simply driven by the first sliding-gear nut, and it is only when the first nut reaches the end of its travel that the second nut, being displaced on the second threaded part, actuates the halting switch. Since the pitch of the second threaded part is greater than the pitch of the first part, the second nut, still immobilized in rotation by the first nut, is then displaced more quickly than the first nut. The counting and halting functions are thus dissociated and are ensured by the first and the second threaded parts of the bar, respectively.

The threaded bar can be fixed in rotation or rotary.

In a particular embodiment, the first and the second threaded parts of the bar are separated by a section of reduced diameter whose length is such that the first nut can escape from the first threaded part after the second nut has engaged on the second threaded part, and the two nuts are linked in rotation via flexible elements capable of moving apart and permitting their relative rotation in the event where a torque would continue to be exerted on the first nut, or on the threaded bar in the case where the bar is driven in rotation, respectively, after the second nut has come into abutment.

According to an alternative of this particular embodiment, the threaded bar is axially free against the action of a spring, with the result that when the second nut abuts the switch, the bar can be displaced, by reaction, counter to the action of the spring.

BRIEF DESCRIPTION OF THE DRAWINGS

The attached drawing shows, by way of example, several embodiments.

FIG. 7 is a view in axial section of a halting device according to a third embodiment.

FIG. 8 is a detailed view of the nuts in FIG. 7, in section along VIII—VIII in FIG. 9.

FIG. 9 is a view of the same detail in section along IX—IX in FIG. 8.

Figure 1:
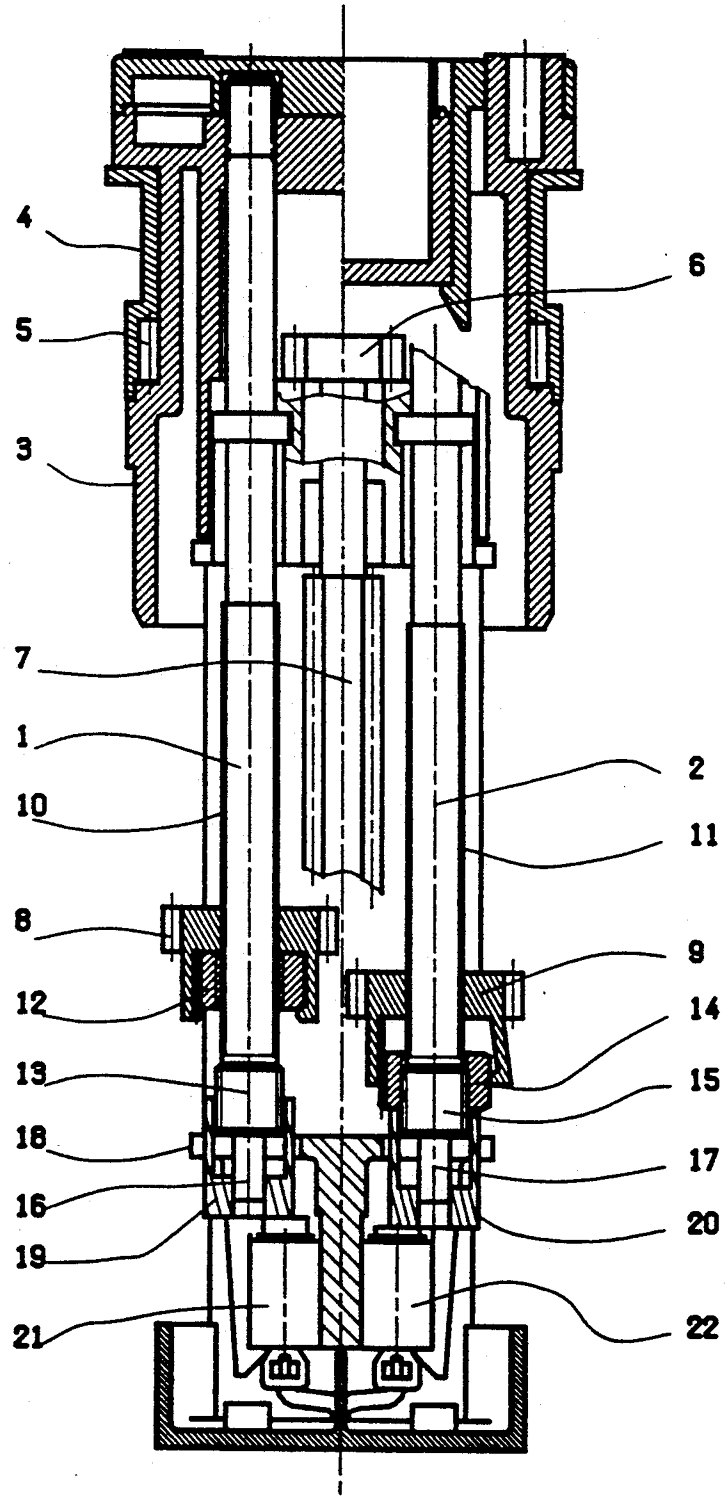
FIG. 1 is a view in axial section of a halting device according to a first embodiment.

All the figures of the drawing show automatic halting devices intended to be mounted in winding tubes of blinds or roller shutters.

DESCRIPTION OF THE PREFERRED EMBODIMENTS

The device shown in FIG. 1 comprises two parallel threaded bars 1 and 2, of opposite pitches, mounted in a tubular frame 3 about which is mounted rotatably a sleeve 4 intended to receive a winding tube (not shown) for a blind or roller shutter. This sleeve 4 is provided with an inner annular gear 5 meshing with a pinion 6 integral with a splined shaft 7 extending parallel to the threaded bars 1 and 2 and meshing with two toothed nuts of opposite pitches 8 and 9 mounted on the threaded bars 1 and 2, respectively, to be more precise mounted on a first threaded part 10, or 11, respectively, of these threaded bars. The sliding-gear nut 8 is integral in rotation with a second nut 12, the internal diameter of which is greater than the diameter of the threaded part 10, with the result that it can be displaced freely on this threaded part 10. This nut 12, on the other hand, is intended to be screwed onto a second threaded part 13 of the threaded bar 1 situated following the part 10, of diameter greater than the diameter of the part 10 and of a pitch greater than the pitch of the part 10. Similarly, the sliding-gear nut 9 is integral in rotation with a second nut 14 identical to the nut 12 but of opposite pitch and intended to be screwed onto a second threaded part 15 of the threaded bar 2, identical to the part 13 but of opposite pitch. The threaded bars 1 and 2 terminate in a smooth part 16, or 17, respectively, by means of which they are mounted in journals in a wall 18 of the frame. Sliding transmission pieces 19 and 20, interacting with a switch 21 and 22 respectively, are furthermore mounted on these smooth parts 16 and 17. The other ends of the threaded bars 1 and 2 are extended so as to be able to be driven in rotation in order to adjust the position of the nuts 8 and 9 on their threaded bars, in a manner known per se.

FIG. 1 shows the sliding-gear nuts 8 and 9 in two different positions, and the second nuts 12 and 14 in two different positions relative to the first nuts 8 and 9. The nuts are shown in more detail in FIGS. 2 to 5 which show them in three successive positions, with the aid of which positions the functioning of the automatic halting device will be described in relation to its novel features.

The first nut 8 is provided with two sets of flexible tabs 23 to 26 and 27 to 30 extending parallel to the axis of the bar 1 about the second nut 12, gripping this nut. The ends of the tabs of the first set 23 to 26 have a part 31 bent back towards the bar so as to retain the second nut 12 axially against the first nut 8, or at the very least in proximity to this nut 8. The second set of tabs 27 to 30 is provided with inner ribs 32 engaged in V-shaped grooves 33 of the nut 12. The nut 12 is thus made integral in rotation with the nut 8 by way of the tabs 27 to 30.

Figure 2:
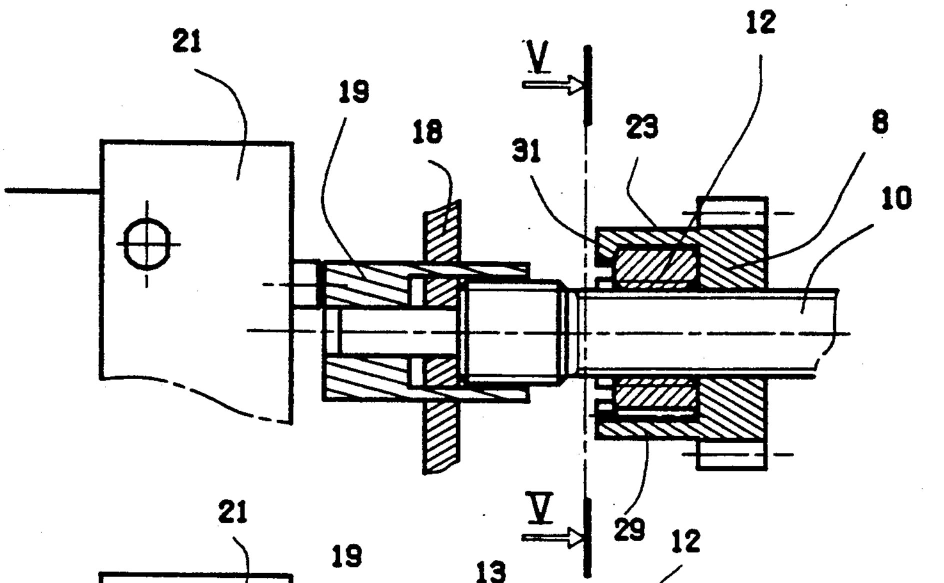
FIGS. 2, 3 and 4 show three successive positions of the nuts of one of the threaded bars of this first embodiment.
Figure 3:
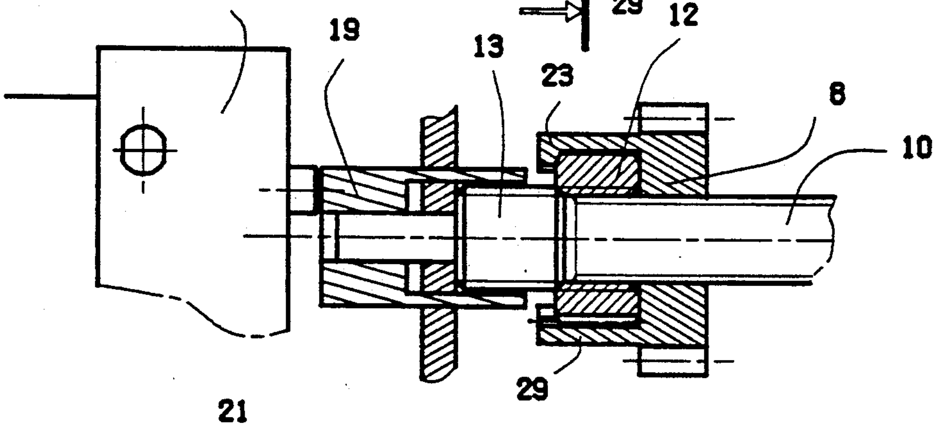
Figure 4:
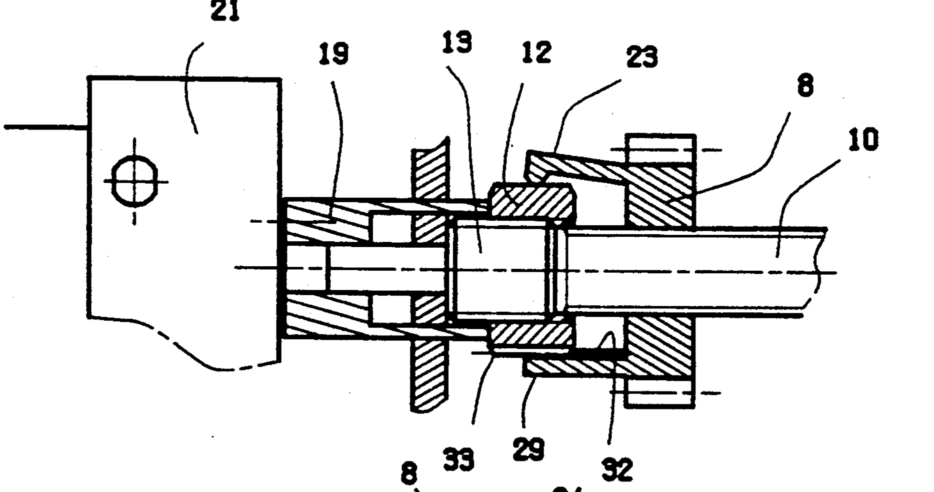
Figure 5:
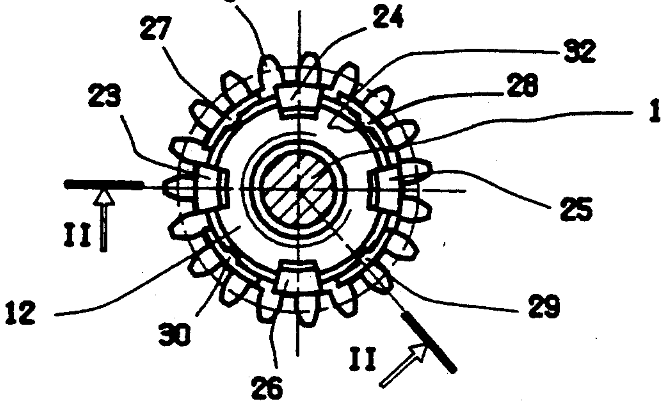
FIG. 5 is a view in section along V—V in FIG. 2.

The device functions as follows: during the revolution-counting period, in other words during the displacement of the door, or the winding up and unwinding, respectively, of the roller blind, the first nut 8 is displaced in a known manner along the first threaded part 10 of the threaded bar, carrying with it the second nut 12. This position is shown in FIG. 2. At a certain moment, when the first nut 8 comes near the end of the first threaded part 10 juxtaposed to the second threaded part 13, the second nut 12 engages with the thread of the second threaded part 13. The nut 12 is, preferably, oriented angularly relative to the nut 8 so as to ensure the accuracy of the engagement of the thread of the nut 12 on the thread of the second threaded part 13. This position is shown in FIG. 3. Since the pitch of the screw thread of the part 13 is larger than the pitch of the screw thread of the part 10, the nut 12, still driven in rotation by the nut 8 by way of the tabs 27 to 30, is displaced more quickly than the nut 8, moving apart the tabs 23 to 26 which retain it axially, and quickly comes into abutment against the transmission piece 19 which, pushed forwards, actuates the switch 21. This position is shown in FIG. 4. The motor is then stopped and the displacement of the main nut 8 is halted.

It will be noted that the making of the two nuts 8 and 12 integral in rotation and in translation could be ensured by one and the same set of tabs, for example by the tabs 23 to 26.

The second threaded bar 2 and its nuts function identically.

Figure 6:
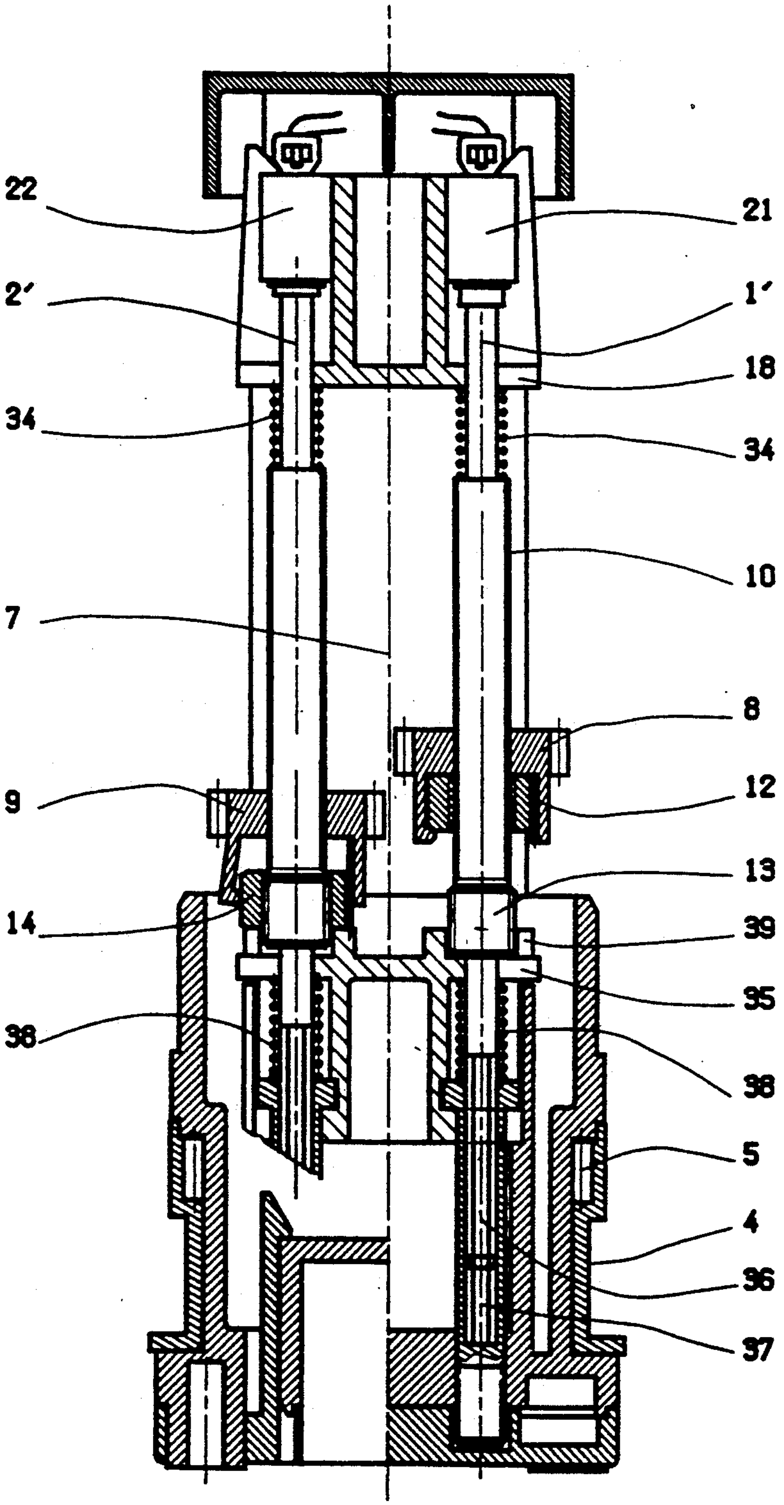
FIG. 6 is a view in axial section of a halting device according to a second embodiment.

The second embodiment shown in FIG. 6 differs from the first embodiment only in that the threaded bars 1' and 2' are capable of being displaced axially in order to actuate the switches 21 and 22. The threaded bar 1' is pushed by a spring 34 working in compression between the wall 18 of the frame and the end of the threaded part 10. The second threaded part 13 of the bar is situated at the end of the threaded part 10 opposite the switch 21. This threaded part 13 abuts a transverse wall 35 of the frame. In this direction, the bar 1' is extended by a profiled part 36, for example hexagonal, engaging slidably in a tubular piece of the same internal profile 37 which can be driven in rotation from outside in order to adjust the position of the nut 8, in a manner known per se. This tubular adjusting piece is held in position by a spring 38. This second embodiment is otherwise similar to the first embodiment. When the second nut 12 reaches the end of its travel, it abuts a fixed stop 39 and, by reaction, it is the threaded bar 1' which recoils and actuates the switch, as shown for the bar 2' and the nuts 9 and 14.

In the first embodiment, when the nuts are in abutment and at the end of their travel, the nuts 8 and 9 are locked and damage can result if they are acted on forcibly, for example manually. This may be avoided by a measure provided in the third embodiment shown in FIGS. 7 to 9. In these figures, for the sake of simplicity, pieces identical to those in the first embodiment are designated by the same references, and only the differences will be described. The threaded parts 10 and 13 of the threaded bar 1 are separated by a smooth section 40 of reduced diameter relative to the threaded part 10. The length of this section 40 is greater than the length of the screw thread of the first nut 8 but less than the total length of the screw threads of the nuts 8 and 12. This smooth section 40 does not prevent the second nut 12 from engaging with the second threaded part 13, but before it has come into abutment with the transmission piece 19, the first nut 8 escapes from the threaded part 10 and rotates freely about the section of reduced diameter 40, continuing however to drive the second nut 12 in rotation until the latter actuates the switch 21. If, at this instant, the first nut 12 continues to be driven in rotation, for any reason whatsoever, its flexible tabs, here numbering three, 27 to 29 (FIGS. 8 and 9) move apart, permitting the nut 8 to rotate relative to the nut 12. The nut 8 can thus continue to rotate without axial displacement and without any risk of a locking likely to damage the halting device. When the motor is reversed, a spring 41, compressed by the nut 8, ensures the engagement of the nut onto the threaded part 10. The same applies for the nut 9.

An intermediate section of reduced diameter could also be provided on the bars 1' and 1' of the second embodiment shown in FIG. 6.

Figure 12:
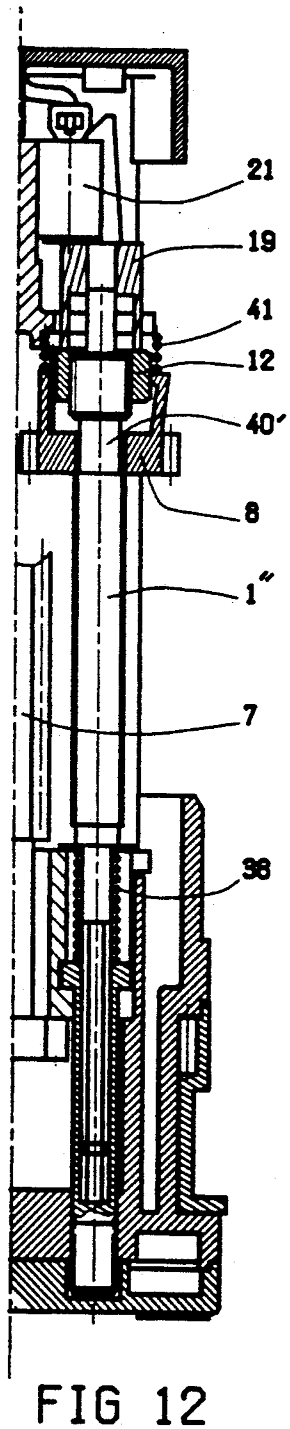
FIG. 12 is a view similar to FIG. 10 showing the nuts in a third position and the threaded bar in a different axial position.
Figure 11:
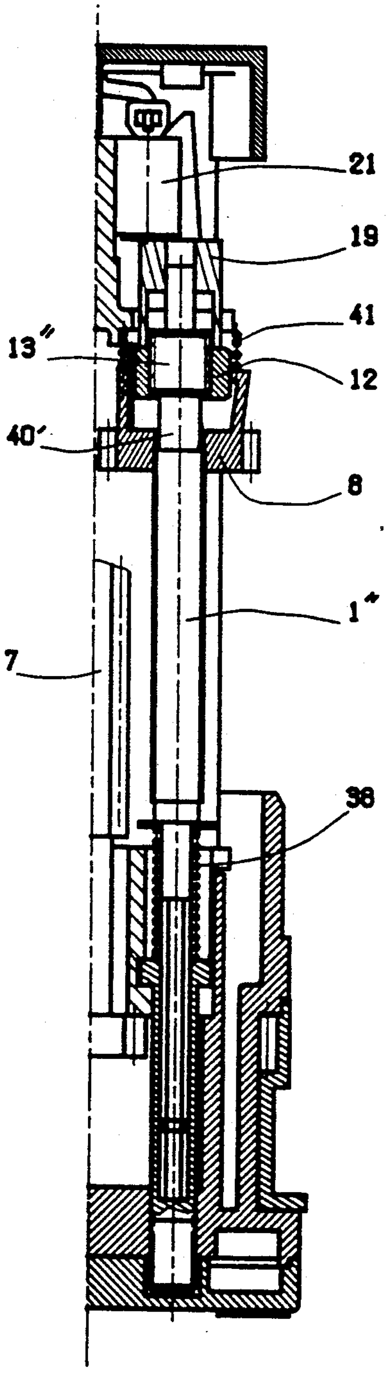
FIG. 11 is a view similar to that in FIG. 10 showing the nuts in a second position.
Figure 10:
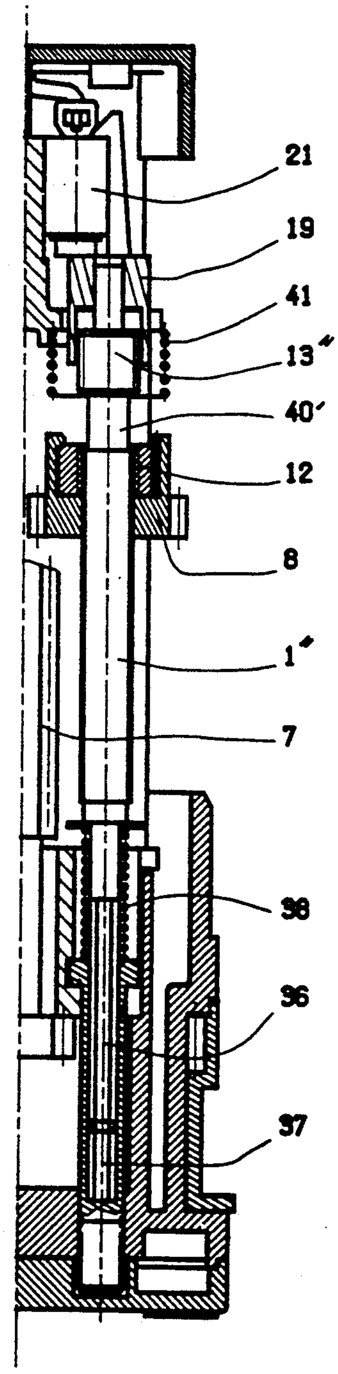
FIG. 10 is a half-view in axial section of a halting device according to a fourth embodiment, in a first position of the nuts.

FIGS. 10, 11 and 12 show a fourth embodiment in four successive positions. This fourth embodiment is derived from the third embodiment shown in FIG. 7. It differs from the third embodiment in that the threaded bar 1" can move axially, as in the second embodiment shown in FIG. 6. Certain elements identical to those in FIG. 6 are again found here, designated by the same references. This fourth embodiment differs, however, from the second embodiment in that it is the second nut 12 which actuates the switch 21, via a transmission piece 19, and not the threaded bar, by reaction. It will be noted that, for the same dimensions of the nuts 8 and 12, the length of the section of reduced diameter 40' is less than the length of the sector 40 in FIG. 7, the length of the sector 40' being slightly greater than the length of the screw thread of the nut 8 and approximately equal to the length of the screw thread of the second nut 12. This means that the nut 8 is still completely on the corresponding threaded part of the threaded bar 1" when the second nut 12 engages with the thread of the second part 13".

FIG. 10 shows the device when the unit formed by the two nuts 8 and 12 reaches the end of the first threaded part 1".

FIG. 11 shows the position of the nuts 8 and 12 at the instant when the second nut 12 actuates the switch 21 via the transmission piece 19. It can be seen that the first nut 8 is still engaged on the screw thread of the bar 1". If, at this instant, for any reason whatsoever, the second nut 12 continues to be driven in rotation via the first nut 8, the threaded bar 1" recoils, compressing its spring 38, and the first nut 8 escapes from the corresponding threaded part of the bar 1", as shown in FIG. 12. The nut 8 then rotates freely on the secton 40' and its elastic tabs permit it to come out of its integral connection in rotation with the second nut 12. The fact that the threaded bar 1" is capable of being displaced axially therefore allows there to be a substantial length of screw thread engaged in the first nut, at the instant when the second nut engages onto the threaded part of elongated pitch, which improves the operational safety of the device.

As is the case in FIG. 7, a return spring 41 ensures, when it returns, the engagement of the first nut 8 onto the first threaded part of the bar.

Figure 13:
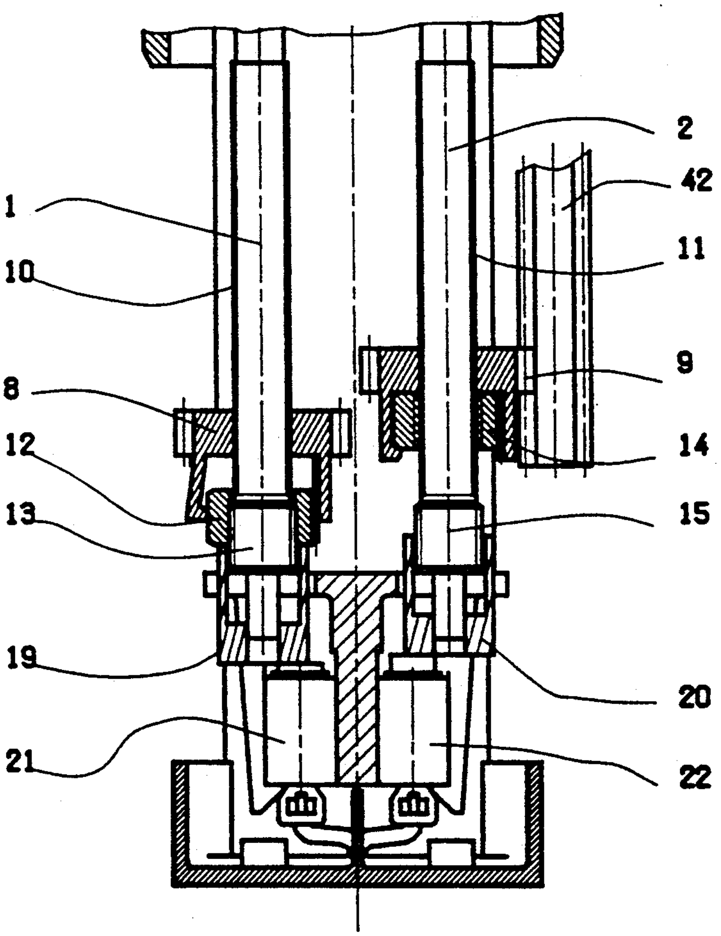
FIG. 13 is a partial view, in axial section, of a halting device according to a fifth embodiment, in which the threaded bars are driven in rotation.
Figure 14:
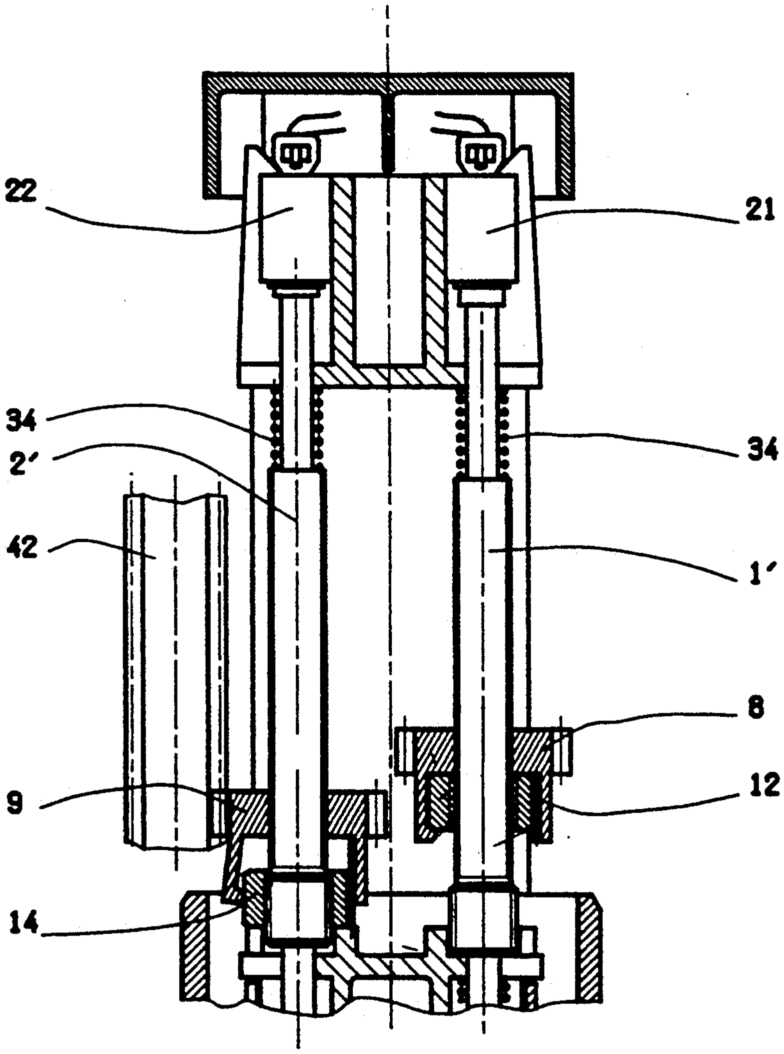
FIG. 14 is a partial view, in axial section, of a sixth embodiment, in which the threaded bars are driven in rotation and can be displaced axially.

The invention extends also to devices in which the threaded bars are driven in rotation and the nuts are immobilized in rotation. FIGS. 13 and 14 partially show such embodiments. In FIG. 13, it can be seen that the nut 9 is immobilized by a splined shaft 42 normally fixed in rotation but capable of being driven manually in rotation in order to adjust the position of the nut 9. The other main nut 8 meshes with a splined shaft similar to the shaft 42. This embodiment is otherwise identical to the first embodiment.

In the embodiment shown in FIG. 14, the threaded bars 1' and 2' are also driven in rotation and can move axially, whereas the annular gears of the nuts 8 and 9 each engage with a splined shaft 42 normally immobilized in rotation. This embodiment is otherwise similar to the embodiment shown in FIG. 6, in other words the switches 21 and 22 are actuated by the axial displacement of the threaded bars 1' and 2', compressing the return springs 34.

The making of the nuts integral in rotation by means of flexible tabs could be effected with different profiles. For example, the nut 12 could have a polygonal contour, and the tabs of the first nut would then bear simply on the faces of the second nut. The same tabs could ensure the axial retention and the making integral in rotation.

Figure 15:
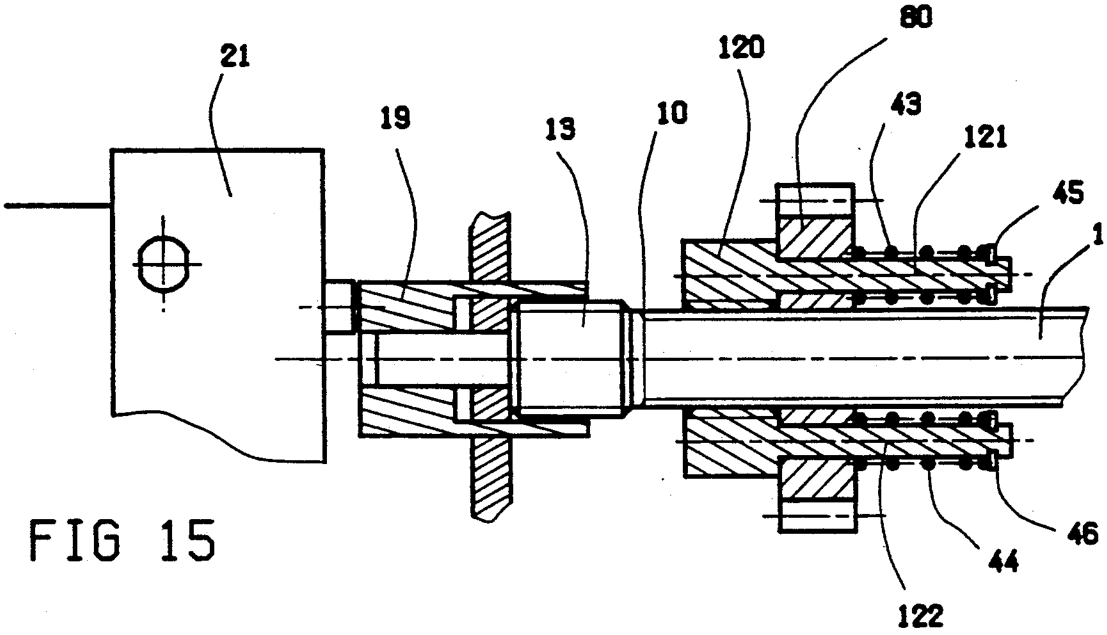
FIG. 15 is a partial view, in axial section, of an alternative embodiment of the sliding-gear nuts, in a first position.
Figure 16:
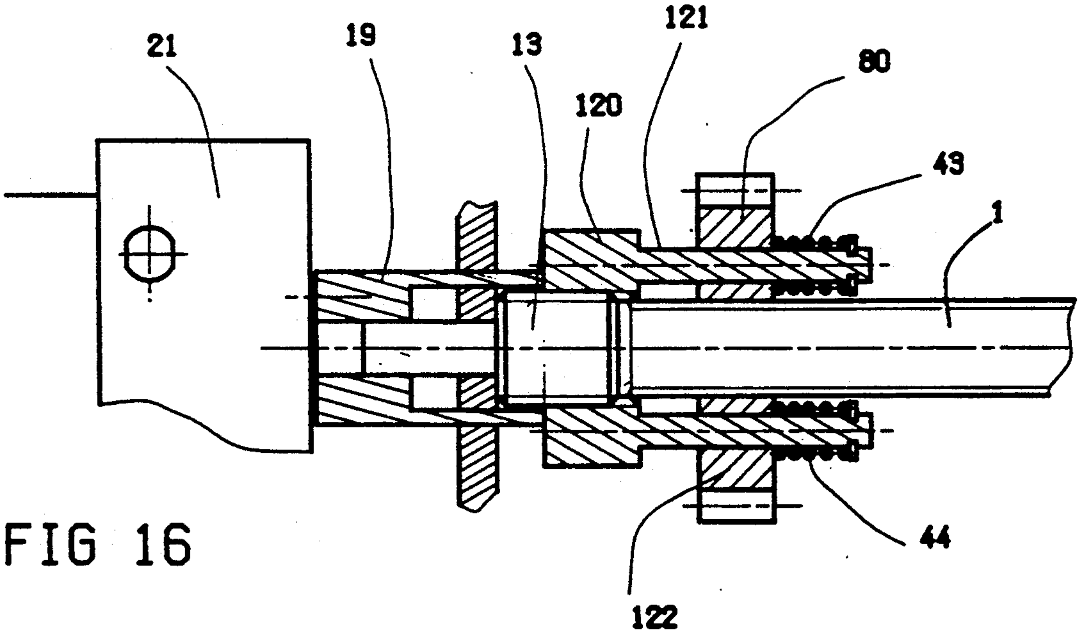
FIG. 16 shows the same alternative in a second position.

The coupling of the first and second sliding-gear nuts could be effected in numerous different ways. An alternative embodiment is shown, by way of example, in FIGS. 15 and 16. The second nut 120 is provided with two rods 121 and 122 parallel to the threaded bar 1 and traversing the first nut 80. Around each of its arms is mounted a spring 43, and 44, respectively, working in compression between the first nut 80 and a circlip 45 and 46, respectively, fixed at the end of each of the rods 121 and 122. The second nut 120 is thus made integral in rotation with the nut 80 but can be displaced axially relative to the latter, as shown in FIG. 16, compressing the springs 43 and 44.

We claim:

1. A device for automatically halting an electric motor after a certain number of revolutions, comprising at least one threaded bar (1, 2) on which is mounted a first sliding-gear nut (8, 9; 80), means (5, 6) for coupling to the motor which drive one of these elements, the bar or the nut, in rotation, means (42) for immobilizing the other of said elements in rotation, and a switch (21, 22) actuated when the sliding-gear nut reaches the end of its travel on the threaded part of the bar, wherein the threaded bar has a first threaded part and a second threaded part (13, 15) at one of its ends, said second threaded part substantially shorter than the first threaded part (10, 11) and has a diameter (12) greater than the diameter of the first thread part and the thread of said second threaded part has a pitch substantially greater than the pitch of the thread of the first threaded part, wherein the device comprises a second sliding-gear nut (12, 14) linked to the first sliding-gear nut and interacting with the second threaded part of the bar, and means (23 to 30; 121, 122) for making the two nuts integral in rotation whilst at the same time permitting a limited relative axial displacement of the nuts, when the second nut engages with the second threaded part of the bar, the switch being actuated directly or indirectly by the second nut after a certain displacement of the latter on the second threaded part of the bar.

2. The device as claimed in claim 1, wherein the second threaded part (13, 14) is separated from the first threaded part by a section (40; 40') of reduced diameter and of a length between the length of the screw thread of the first nut and the total length of the screw threads of the two nuts, and on which the first nut can rotate freely.

3. The device as claimed in claim 1, wherein, in order to make the nuts integral in rotation, the first nut (8, 9) is provided with flexible tabs (27 to 30) extending parallel to the axis about the second nut (12, 14) and interacting with profiles (33) of the second nut.

4. The device as claimed in claim 3, wherein the profiles (33) of the second nut consist of V-shaped notches in which engage corresponding profiles (32) of said tabs, these profiles permitting a spacing apart of the tabs and a rotation of the first nut relative to the second nut under the effect of a load moment.

5. The device as claimed in claim 3, wherein the first nut (8, 9) has a second set of flexible tabs (23 to 26) extending parallel to the axis about the second nut and the ends of which are bent back so as to hook axially onto the second nut when the second nut is close to the first nut, the contact surfaces of the ends of these tabs and of the second nut being such that the second nut can move these tabs apart when it is displaced axially relative to the first nut.

6. The device as claimed in claim 1, wherein the threaded bar (1, 2) is fixed in translation.

7. The device as claimed in claim 1, wherein the threaded bar (1', 2') can move in translation counter to a spring, and wherein the switch is actuated by the threaded bar, when the second nut (12, 14) comes into abutment at the end of its travel.

8. The device as claimed in claim 2, in which the switch is actuated by the second nut, wherein the length of the section of reduced diameter (40') is substantially less than the total length of the screw threads of the two nuts, and wherein the threaded bar (1'') can move axially counter to a spring (38), such that, in a first stage, the first nut (8) continues to rotate relative to the threaded bar, when the second nut (12) is in abutment, causing the axial displacement of the threaded bar, and then leaves the first threaded part after a certain axial displacement of this bar.

* * * * *